United States Patent [19]

Smrt et al.

[11] Patent Number: 5,453,219
[45] Date of Patent: Sep. 26, 1995

[54] AEROSOL-BASED COMPOSITIONS USEFUL FOR THE PRODUCTION OF AN ABRASIVE SURFACE AND A METHOD FOR THE PRODUCTION THEREOF

[75] Inventors: Thomas J. Smrt, Marengo; Walter S. Mierzwinski, Schaumburg, both of Ill.

[73] Assignee: Fox Valley Systems, Inc., Cary, Ill.

[21] Appl. No.: 532,944

[22] Filed: Jun. 4, 1990

[51] Int. Cl.$^6$ ........................................ C09K 3/30
[52] U.S. Cl. .................. 252/305; 106/36; 51/295; 524/903; 427/421
[58] Field of Search ................ 252/305; 106/36; 524/903; 51/295, 298; 427/421

[56] References Cited

U.S. PATENT DOCUMENTS

| | | | |
|---|---|---|---|
| 2,524,590 | 10/1950 | Boe | 252/305 |
| 2,764,454 | 9/1956 | Edelstein | 53/470 |
| 3,383,344 | 5/1968 | Gill | 524/903 X |
| 3,764,067 | 10/1973 | Coffey et al. | 239/1 |
| 3,878,147 | 4/1975 | Craven | 524/903 X |
| 3,971,162 | 7/1976 | Bellsmith | 51/412 |
| 3,974,945 | 8/1976 | Burger | 222/192 |
| 3,989,861 | 11/1976 | Rasmussen | 427/180 |
| 4,110,427 | 8/1978 | Kalat | 424/46 |
| 4,348,496 | 9/1982 | Puhe et al. | 524/127 |
| 4,653,236 | 3/1987 | Grimes et al. | 51/298 X |
| 4,813,976 | 3/1989 | Barchas | 51/293 |
| 4,945,686 | 8/1990 | Wiand | 51/298 X |

OTHER PUBLICATIONS

Derwent Abstract 75–47754w/29 (corresponding to FR2262675 and GB1488415).

*Primary Examiner*—Gary L. Geist
*Assistant Examiner*—Daniel S. Metzmaier
*Attorney, Agent, or Firm*—Leydig, Voit & Mayer, Ltd.

[57] ABSTRACT

An aerosol composition for producing a surface having an abrasive grit adhered thereto, which composition can be dispensed from a suitable aerosol container, said composition comprising abrasive grit, a binder solution which is suitable for affixing said grit onto the surface comprising a polymeric resin and an organic solvent which dissolves said resin, the resin being capable of adhering to said surface and to said grit, and a liquid propellant. The present invention also provides an aerosol means for producing a surface having an abrasive grit adhered thereto comprising an aerosol dispensing means and having contained therein the aforementioned aerosol composition.

In addition, there is provided a method for the production of an abrasive surface from a preselected substrate using an aerosol composition comprising spraying an aerosol composition onto the preselected surface, said composition comprising abrasive grit, a binder solution which is suitable for affixing said grit onto the surface comprising a polymeric resin and an organic solvent which dissolves said resin, the resin being capable of adhering to said surface and to said grit, and a liquid propellant, and allowing the solvent to evaporate such that said abrasive surface is produced.

29 Claims, No Drawings

AEROSOL-BASED COMPOSITIONS USEFUL FOR THE PRODUCTION OF AN ABRASIVE SURFACE AND A METHOD FOR THE PRODUCTION THEREOF

FIELD OF THE INVENTION

The present invention relates to a composition and related method for the production of an abrasive surface which is suitable for sanding wood, metal, plaster and the like.

BACKGROUND OF THE INVENTION

Commercially available abrasive materials, such as sandpaper and the like, are generally produced by adhering an abrasive grit onto a substrate. In the case of sandpaper, a paper substrate is used. When used to sand an area, sandpaper is generally used by affixing the sandpaper onto a form, such as a sanding block, and then sanding the area until the abrasive grit on the sandpaper is either "clogged" by the material removed from the item or is detached from the paper backing due to the force of friction. After either of these occurrences, the abrasive paper must be removed from the form and replaced with new sandpaper, a time consuming process.

In situations where a curved, or non-planar, surface requires sanding, e.g., cylindrical chair legs, the use of paper is particularly inadequate as any forms used in the sanding process, for best results, must also be curve-shaped. Accordingly, the flat sheet of sandpaper must be adhered to a curved form. This, however, makes changing paper troublesome and adds to the time required to sand an item.

In view of the problems associated with the abrasive surfaces and methods for producing these surfaces described previously, there exists a need for an aerosol composition and related method for providing an abrasive, sandpaper-like surface which may be used almost immediately after its production to remove paint and other coatings from selected items as well as to smooth wood, metal, plaster, and like surfaces. Moreover, a composition and related method are needed which would allow a new layer of abrasive material to be quickly and easily applied to a surface that has been rendered relatively non-abrasive through use, thereby rejuvenating the abrasive surface. Further, there is a specific need for an abrasive surface which is capable of being used to sand a curved item and which may be easily and quickly rejuvenated.

These and other advantages of the present invention, as well as additional inventive features, will become apparent from the description which follows.

SUMMARY OF THE INVENTION

In accordance with the foregoing objectives, the present invention provides an aerosol composition for producing a surface having an abrasive grit adhered thereto, which composition can be dispensed from a suitable aerosol container, said composition comprising abrasive grit, a binder solution which is suitable for affixing said grit onto the surface comprising a polymeric resin and an organic solvent which dissolves said resin, the resin being capable of adhering to said surface and to said grit, and a liquid propellant. The present invention also provides an aerosol means for producing a surface having an abrasive grit adhered thereto comprising an aerosol dispensing means and having contained therein the aforementioned aerosol composition.

In addition, there is provided a method for the production of an abrasive surface from a preselected substrate using an aerosol composition comprising spraying an aerosol composition onto the preselected surface, said composition comprising abrasive grit, a binder solution which is suitable for affixing said grit onto the surface comprising a polymeric resin and an organic solvent which dissolves said resin, the resin being capable of adhering to said surface and to said grit, and a liquid propellant, and allowing the solvent to evaporate such that said abrasive surface is produced.

The present invention may be more completely understood with reference to the following detailed description of the preferred embodiments.

DETAILED DESCRIPTION OF THE INVENTION

While the present invention will be described in connection with certain preferred embodiments, it is not intended that the present invention be so limited. On the contrary, it is intended to cover all alternatives, modifications, and equivalent arrangements as may be included within the spirit and scope of the invention as defined by the appended claims.

As stated previously, the present invention provides an aerosol composition for producing a surface having an abrasive grit adhered thereto which can be dispensed from a suitable aerosol container, said composition comprising abrasive grit, a binder solution which is suitable for affixing said grit onto the surface comprising a polymeric resin and an organic solvent which dissolves said resin such that said resin adheres to the surface and said grit adheres to said resin, and a liquid propellant. The present invention has the advantage of being able to be reapplied onto a used and relatively non-abrasive surface to rejuvenate the surface after it becomes "clogged" with particles or the abrasive grit wears off the surface due to the friction associated with the sanding. In addition, the present invention allows a curved abrasive surface to be easily and quickly produced, as well as rejuvenated, allowing curved surfaces to be efficiently sanded.

Turning initially to the propellant, the present invention contemplates the use of any type of propellant or mixture of propellants that will aerosolize the composition. Typically, liquid propellants are used to provide such aerosolization. By using the term "liquid propellant," it is contemplated that such propellant is gaseous at room temperature and atmospheric pressure but liquid under pressure contained within an aerosol can.

The ethers, e.g., dimethyl ether, may be used in the present inventive compositions with some degree of success and, as such, are claimed herein. However, they are not favored due to their known disadvantages, i.e., relatively high cost in comparison to other available propellants. Water-immiscible propellants contemplated by the invention include non-halogenated hydrocarbons other than the ethers, e.g., ethane, propane, and butane, and halogenated hydrocarbons, e.g., Freon 12® and Dymell 22®, as well as mixtures of these various water-immiscible propellants. Use of the halogenated hydrocarbons is presently on the decline, however, due to environmental concerns over their effect on the ozone layer surrounding the earth. As such, use of these types of propellants is not preferred.

The quantity of propellant utilized will vary based upon the specific aerosol composition formulated. Generally, the amount of propellant present should be that which is sufficient to expel substantially all of the components from the containment means. However, the sufficiency of propellant in an aerosol is typically determined by reference to the vapor pressure inside the can. Typically, when the pressure in the can reaches a range of from about 30 to 85 psig at 70° F., a sufficient amount of propellant has been introduced therein. Preferably, the pressure ranges from about 40 to 80 psig.

In order to reach the aforesaid pressures, the propellant is generally present in an amount ranging from about 10 to about 25 wt. percent of the composition. Preferably, about 15 to about 20 wt. percent of propellant will be in the composition. However, if dimethyl ether is used, amounts at the higher end of the range will be necessary due to its characteristic lowering of vapor pressure upon exposure to solvents. Most hydrocarbons and halogenated hydrocarbons do not suffer from this loss of vapor pressure effect and may therefore be present in a lesser amount. Further, the other propellants are typically less expensive than dimethyl ether and are less flammable, making these two classes of propellants, and most advantageously hydrocarbons other than the ethers, the preferred propellants.

The polymer resin utilized in the present invention may be of any type so long as it is able to adhere to the desired surface after application thereto. Further, after application onto the surface, the grit must adhere to the resin such that an abrasive surface is formed. In view of these two primary requirements, carboxyl-modified, i.e., carboxyl containing, vinyl resins have been found to be especially suitable for inclusion in the present aerosol compositions. In particular, the preferred resin is selected from the group consisting of high molecular weight vinyl chloride/vinyl acetate/maleic acid terpolymers having carboxyl functionality, e.g., VMCH (Union Carbide Corp.), medium molecular weight vinyl chloride/vinyl acetate/maleic acid terpolymers having carboxyl functionality, e.g., VMCC (Union Carbide Corp.), low molecular weight vinyl chloride/vinyl acetate/maleic acid terpolymers having carboxyl functionality, e.g., VMCA (Union Carbide Corp.), low molecular weight vinyl chloride/maleate terpolymers having carboxyl functionality, e.g., OXY 470 (Occidental Chemical Corp.), and mixtures thereof. These polymers are preferred in view of their excellent ability to adhere to a wide variety of surfaces including metal, wood, and certain plastics, even under ambient temperature conditions. The ability of those specific resins described previously to adhere to a wide range of surfaces is generally thought to be attributable to the carboxyl functionality.

The amount of polymer resin present in said composition ranges from about 5 to about 25 wt. percent of the composition, this being an amount which is sufficient to bind the grit to the resin. If an excess of resin is employed, the resulting composition has a high viscosity and its ability to be discharged from a container as a spray is compromised. In view of these limits, the resin present in the composition preferably ranges from about 5 to about 15 wt. percent of the composition and most preferably from about 5 to about 10 wt. percent.

As stated previously, the degree of adherence is primarily a function of the particular resin employed, with a sufficient amount of solvent being necessary to ensure the dissolving of the resin such that the resin adheres to the surface adequately. While any solvent which possesses the aforementioned properties may be used, those which evaporate relatively quickly are advantageously employed. Quick evaporating solvents are usually utilized as it is contemplated that use of the abrasive surface will begin shortly after the aerosol composition is applied onto the surface. Examples of acceptable solvents, which may be used alone or in combination, include ketones and esters such as, e.g., n-butyl acetate, ethyl acetate, methyl ethyl ketone, and mixtures thereof.

The amount of solvents present in the composition generally ranges from about 25 to about 75 wt. percent of the composition. Preferably, the amount ranges from about 35 to about 45 wt. percent of the composition. If an excess of solvent is included in the composition, its viscosity will be low and the ability of the composition to be discharged from the aerosol container will be compromised. Therefore, the maximum amount of solvent in the composition should usually be limited to about 75 wt. percent.

An abrasive grit is also present in the aerosol composition in an amount which is sufficient to provide an acceptable abrasive surface. Generally, the abrasiveness of the surface is contingent upon three factors, the size and shape of the abrasive particles, the quantity of said particles per unit surface area, and the type of grit utilized. For example, the greater the quantity of grit, the greater the abrasiveness of the resulting surface, due to an increase in amount of grit per unit area. Further, the greater the size of the grit, the greater the relative surface abrasiveness.

Generally, an amount of grit ranging from about 1 wt. percent to about 60 wt. percent of the composition [wide range] will be used, the amount varying with the degree of abrasiveness desired. The inclusion of a greater amount of grit in the composition may result in the composition being compromised to the extent that the composition will not be propelled from the aerosol container properly. Further, inclusion of an excess amount of grit may affect the ability of the resin to properly bind to substantially all of the grit, as the amount of resin present in the composition is limited to a maximum of about 25 wt. percent due to viscosity limitations. Preferably, the amount of grit included in the present composition ranges from about 5 to about 50 wt. percent.

The grit may be of any material which is suitable for accomplishing the objects of the present invention, but is advantageously selected from the group consisting of sand, garnet, aluminum oxide, emery dust, pumice, and mixtures thereof. The grit is added to the composition in its natural form, i.e., without being coated with any type of composition such as a polymer or resin coating.

As mentioned previously, the size of the grit is also important in regard to the ultimate coarseness of the abrasive surface that is produced. Generally, any grit up to about 86 microns in diameter, i.e., 180 grit, may be used. The grit employed will have a generally spherical configuration, as opposed to a thin flake. Thin flakes, such as those described in U.S. Pat. No. 3,764,067 are not contemplated by the present invention due to their lack of abrasiveness. This upper limit relating to the size of the grit, however, should not be viewed as an absolute limitation—it is only in place due to the limitations of the spraying apparatus employed, specifically the diameter of the valve opening used in conventional aerosol containers, i.e., about 0.025 inches. If a valve with a larger opening is available, and an appropriately sized actuator is used, the grit size may be increased accordingly.

The valve and actuator used in combination with the present invention are conventional and may be obtained from, e.g., Summit Packaging Systems, Inc., Manchester, N.H. Although any sized valve may be used, it should be greater than the average diameter of the specific grit selected. This ensures that the grit is able to be discharged from the aerosol containment means. The actuator selection follows the same rationale in regard to its orifice, but may be further limited by the spray pattern desired. Typically, and assuming for example that 180 grit, i.e., about 0.0036 inches in diameter, is employed, a valve having an opening diameter of about 0.025 inches would be selected and combined with an actuator having an orifice size of 0.023 inches in diameter.

The containment means may be of any conventional design. The container selected should be able to withstand the pressure exerted by the propellant after the composition has been placed into the container. Suitable containers are available from the U.S. Can Company of Elgin, Ill.

Other components which may be optionally employed in the present composition include a resin stabilizer in an amount sufficient to stabilize the composition. The preferred resin stabilizer is ARALDITE 6010 (Ciba-Geigy).

The composition may also include an anti-caking material in an amount sufficient to prevent caking of the composition. This material is generally thought to retard hard settling of the composition. The present composition incorporates AEROSIL R-972 (DeGussa Corporation, Teperboro, N.J.), a fumed silica product, as its preferred anti-caking material.

A modified clay suspension additive may be further included in an amount sufficient to reduce sagging and settling. BENTONE SD-2® (NL Industries, Inc., Heightstown, N.J.) is the preferred clay additive.

The related method provided by the present invention generally comprises spraying the aforementioned composition onto a suitable surface. After discharging the composition from the aerosol container, the grit and the binder solution contact the surface, the solvent then evaporating, leaving the resin adhered to the surface and the grit adhered to the resin such that a rough, sandpaper-like surface is produced. After the use of abrasive surface begins, any resin that might be covering the exterior surface of the grit would be removed by the force of friction.

The following are examples of the present composition.

EXAMPLE 1

A binder solution is prepared according to the following procedure.

| Component | Wt. percent |
|---|---|
| A. Place the following into a suitable container: | |
| n-butyl acetate | 31.8 |
| B. Add to the acetate while mixing: | |
| OXY 470 | 14.9 |
| C. Add: | |
| BENTONE SD-2 ® | 2.5 |
| AEROSIL R-972 | 1.2 |
| D. Mix at high speed for 15–20 minutes, then add: | |
| ARALDITE 6010 | 1.2 |
| Ethyl acetate | 48.4 |
| E. Mix until uniform | |
| TOTAL | 100.0 |

A standard 16 ounce aerosol can is filled using 49.1 wt. percent of the previously described binder solution, 35.0 wt. percent of 180 grit (about 86 microns or 0.0034 inches in diameter) aluminum oxide, and 15.9 wt. percent of liquid hydrocarbon as a propellant. The valve and actuator employed consists of a SV-78 valve and 0.023 in diameter standard actuator, respectively, available from the Summit Packaging Systems, Inc.

EXAMPLE 2

A binder solution is again prepared according to the following procedure.

| Component | Wt. percent |
|---|---|
| A. Place the following into a suitable container: | |
| methyl ethyl ketone | 32.3 |
| B. Add the following while mixing: | |
| OXY 470 | 16.5 |
| C. Add: | |
| AEROSIL R-972 | 1.4 |
| D. Mix at high speed for 15–20 minutes, then add: | |
| ARALDITE 6010 | 1.4 |
| Methyl ethyl ketone | 48.4 |
| TOTAL | 100.0 |

An aerosol can is filled as in Example 1 with the same percentages of components.

What we claim is:

1. An aerosol composition for providing a substrate with an abrasive grit upon discharge of said composition from a suitable aerosol container, said composition comprising abrasive grit; a binder solution which is capable of affixing said grit onto the substrate comprising a polymeric resin containing a carboxyl function and an organic solvent which dissolves said resin and a liquid propellant.

2. The aerosol composition according to claim 1, wherein said resin binder is a vinyl resin.

3. The aerosol composition according to claim 1, wherein said resin binder is a vinyl chloride/vinyl acetate/monomer containing a carboxyl function terpolymer.

4. The aerosol composition according to claim 3, wherein the amount of said resin present in the composition ranges from about 5 to about 15 wt. percent of the composition.

5. The aerosol composition according to claim 1, wherein the amount of said solvent ranges from about 25 to about 75 wt. percent of the composition.

6. The aerosol composition according to claim 2, wherein said solvent is selected from the group consisting of ketones, esters, and mixtures thereof.

7. The aerosol composition according to claim 3, wherein the amount of said solvents ranges from about 35 to about 45 wt. percent of the composition.

8. The aerosol composition according to claim 4, wherein said solvent is selected from the group consisting of n-butyl acetate, ethyl acetate, methyl ethyl ketone, and mixtures thereof.

9. The aerosol composition according to claim 5, wherein said grit is present in an amount ranging from about 1 wt. percent to about 60 wt. percent of the composition.

10. The aerosol composition according to claim 6, wherein said grit is selected from the group consisting of sand, garnet, aluminum oxide, emery dust, pumice, and mixtures thereof.

11. The aerosol composition according to claim 10, wherein said propellant is a liquid hydrocarbon propellant selected from the group consisting of ethane, propane, butane, halogenated hydrocarbons, dimethyl ether, and mixtures thereof.

12. The aerosol composition according to claim 9, wherein said propellant is present in said composition in an amount ranging from about 10 to about 25 wt. percent of the composition.

13. The aerosol composition according to claim 1, wherein the size of said grit is limited such that said grit is able to pass through the aerosol container without clogging the container.

14. The aerosol composition according to claim 13, wherein said grit has an average diameter of less than about 86 microns.

15. A method for the preparation of a sandpaper-like abrasive surface from a preselected substrate using an aerosol composition comprising spraying said aerosol composition onto the preselected substrate, said composition comprising abrasive grit, a binder solution which is capable of affixing said grit onto the substrate comprising a polymeric resin containing a carboxyl function and an organic solvent which dissolves said resin and a liquid propellant, and allowing the solvent to evaporate such that said abrasive surface is produced.

16. The method according to claim 15, wherein the amount of resin present in said composition ranges from about 5 to about 25 wt. percent of the composition.

17. The method according to claim 16, wherein said resin binder is a vinyl chloride/vinyl acetate/monomer containing a carboxyl function terpolymer.

18. The method according to claim 17, wherein the amount of said resin present in the composition ranges from about 5 to about 15 wt. percent of the composition.

19. The method according to claim 16, wherein the amount of said solvent ranges from about 25 to about 75 wt. percent of the composition.

20. The method according to claim 16, wherein said solvent is selected from the group consisting of ketones, esters, and mixtures thereof.

21. The method according to claim 17, wherein the amount of said solvents ranges from about 35 to about 45 wt. percent of the composition.

22. The method according to claim 18, wherein said solvent is selected from the group consisting of n-butyl acetate, ethyl acetate, methyl ethyl ketone, and mixtures thereof.

23. The method according to claim 19, wherein said grit is present in an amount ranging from about 1 wt. percent to about 60 wt. percent of the composition.

24. The method according to claim 20, wherein said grit is selected from the group consisting of sand, garnet, aluminum oxide, emery dust, pumice, and mixtures thereof.

25. The method according to claim 24, wherein said propellant is a liquid hydrocarbon propellant selected from the group consisting of ethane, propane, butane, halogenated hydrocarbons, dimethyl ether, and mixtures thereof.

26. The method according to claim 23, wherein said propellant is present in said composition in an amount ranging from about 10 to about 25 wt. percent of the composition.

27. The method according to claim 15, wherein the size of said grit is limited such that said grit is able to pass through the aerosol container without clogging the container.

28. The method according to claim 27, wherein said grit has an average diameter of less than about 86 microns.

29. An aerosol means for providing a substrate with an abrasive grit comprising an aerosol dispensing means and a composition contained within said dispensing means, said composition comprising abrasive grit; a binder solution which is capable of affixing said grit onto the substrate comprising a vinyl chloride/vinyl acetate/carboxyl-containing monomer terpolymer resin and an organic solvent which dissolves said resin; and a liquid propellant.

* * * * *